United States Patent [19]

Blatter et al.

[11] Patent Number: 4,757,747
[45] Date of Patent: Jul. 19, 1988

[54] POWER TRANSMISSION

[75] Inventors: Albert Blatter, Highland; Jeffrey P. Cherry, Rochester; Ronald E. Chipp, Oak Park; James A. Kessler; Richard S. Leemhuis, both of Troy; John A. Miller, Rochester Hills; Melvin A. Rode, West Bloomfield; Gene Y. Wen, Troy, all of Mich.

[73] Assignee: Vickers, Incorporated, Troy, Mich.

[21] Appl. No.: 901,816

[22] Filed: Aug. 29, 1986

Related U.S. Application Data

[63] Continuation-in-part of Ser. No. 849,540, Apr. 8, 1986, abandoned.

[51] Int. Cl.⁴ .............................................. F15B 13/16
[52] U.S. Cl. .................................. 91/362; 91/363 R
[58] Field of Search ................... 91/361, 362, 363 R, 91/459; 364/167, 174, 183; 318/652

[56] References Cited

U.S. PATENT DOCUMENTS

| | | | |
|---|---|---|---|
| 3,555,970 | 1/1971 | Borgeson | 91/363 R |
| 3,898,555 | 8/1975 | Tellerman | 324/208 |
| 4,481,451 | 11/1984 | Kautz et al. | 91/361 X |
| 4,625,622 | 12/1986 | Gunda et al. | 91/361 X |

FOREIGN PATENT DOCUMENTS

| | | | |
|---|---|---|---|
| 93348 | 11/1983 | European Pat. Off. | 91/361 |
| 2729408 | 1/1979 | Fed. Rep. of Germany | |
| 3145894 | 5/1983 | Fed. Rep. of Germany | |
| 85/01007 | 3/1985 | PCT Int'l Appl. | |
| 85/01029 | 12/1985 | PCT Int'l Appl. | 91/361 |
| 2052642 | 1/1981 | United Kingdom | |

Primary Examiner—Edward K. Look
Attorney, Agent, or Firm—Barnes, Kisselle, Raisch, Choate, Whittemore & Hulbert

[57] ABSTRACT

An electrohydraulic system includes a plurality of electrohydraulic devices individually controlled by on-board microprocessor-based control electronics. Each individual device controller is connected to and addressable by a master controller for coordinating operation of the various devices. An electrohydraulic servo valve assembly includes a hydraulic manifold having a valve spool variably positionable therein under control of a torque motor. A microprocessor-based controller is connected to the torque motor and is mounted on the manifold by a cover which encloses and protects both the controller and the torque motor. A watchdog timer in the microprocessor-based controller monitors pulse-width modulated signals to the torque motor for terminating operation in the event of signal loss. In a preferred embodiment of the invention, the servo valve assembly is coupled to a linear actuator which has its position monitored by an electroacoustic transducer. Improved electronics couple the transducer to the control microprocessor.

34 Claims, 11 Drawing Sheets

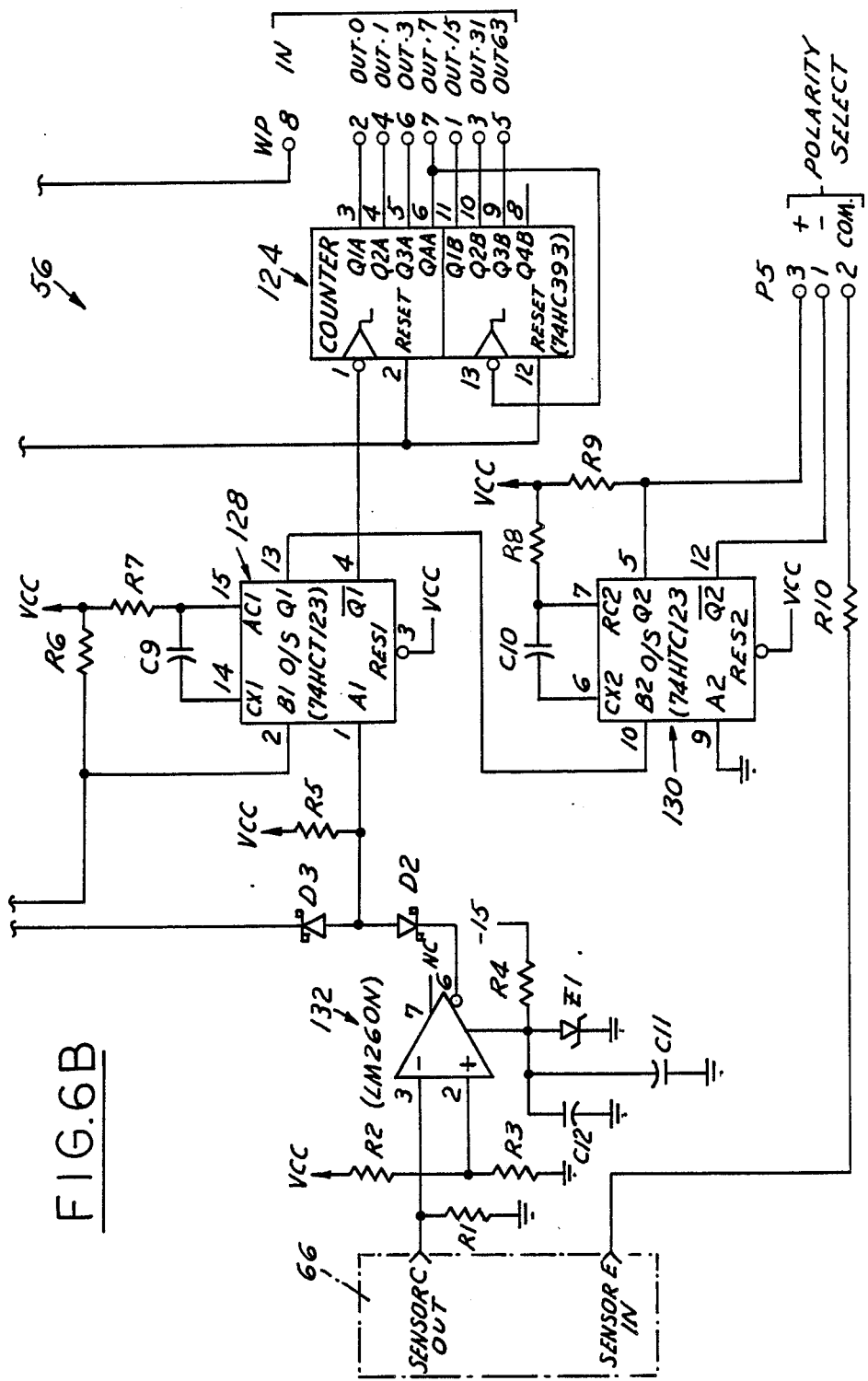

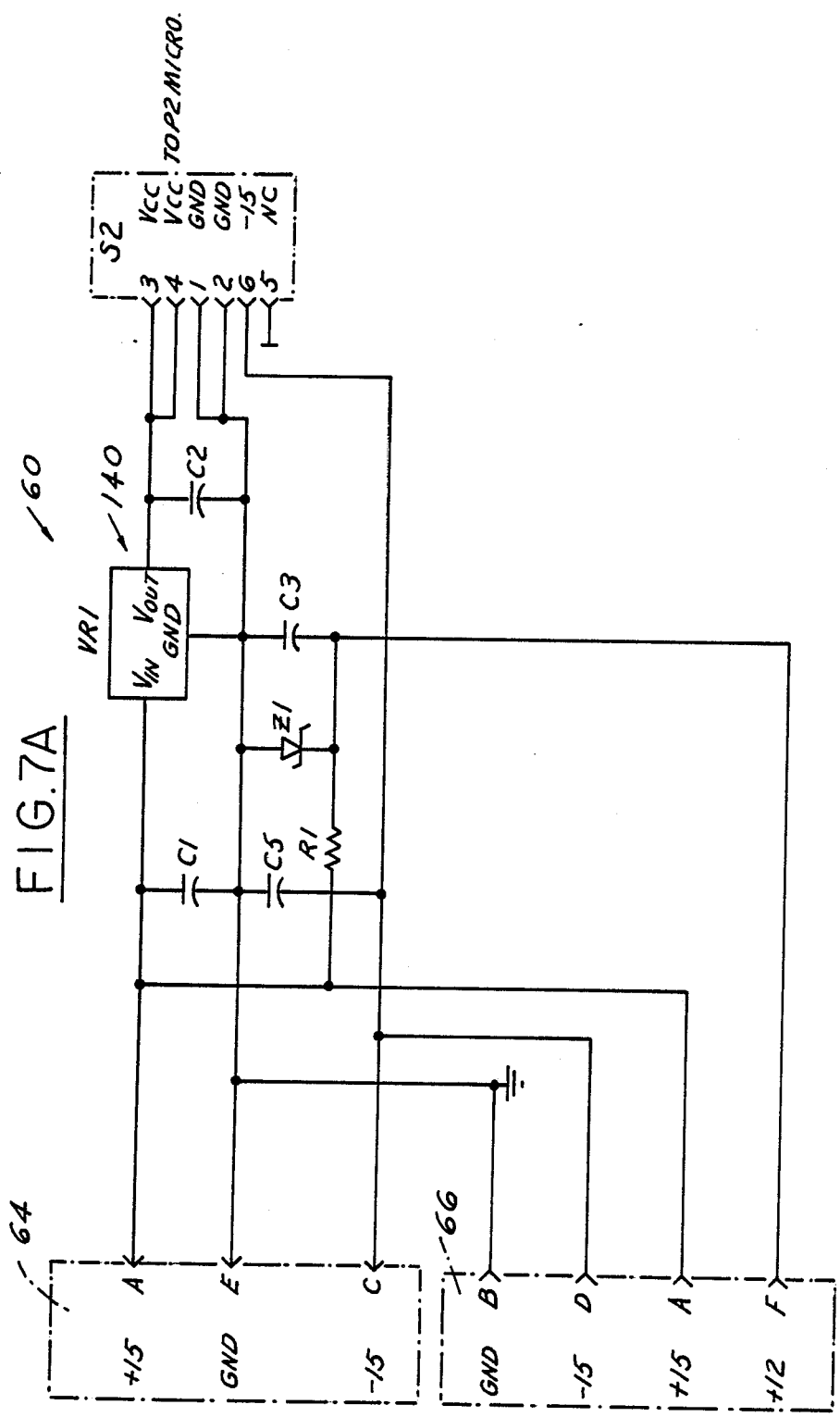

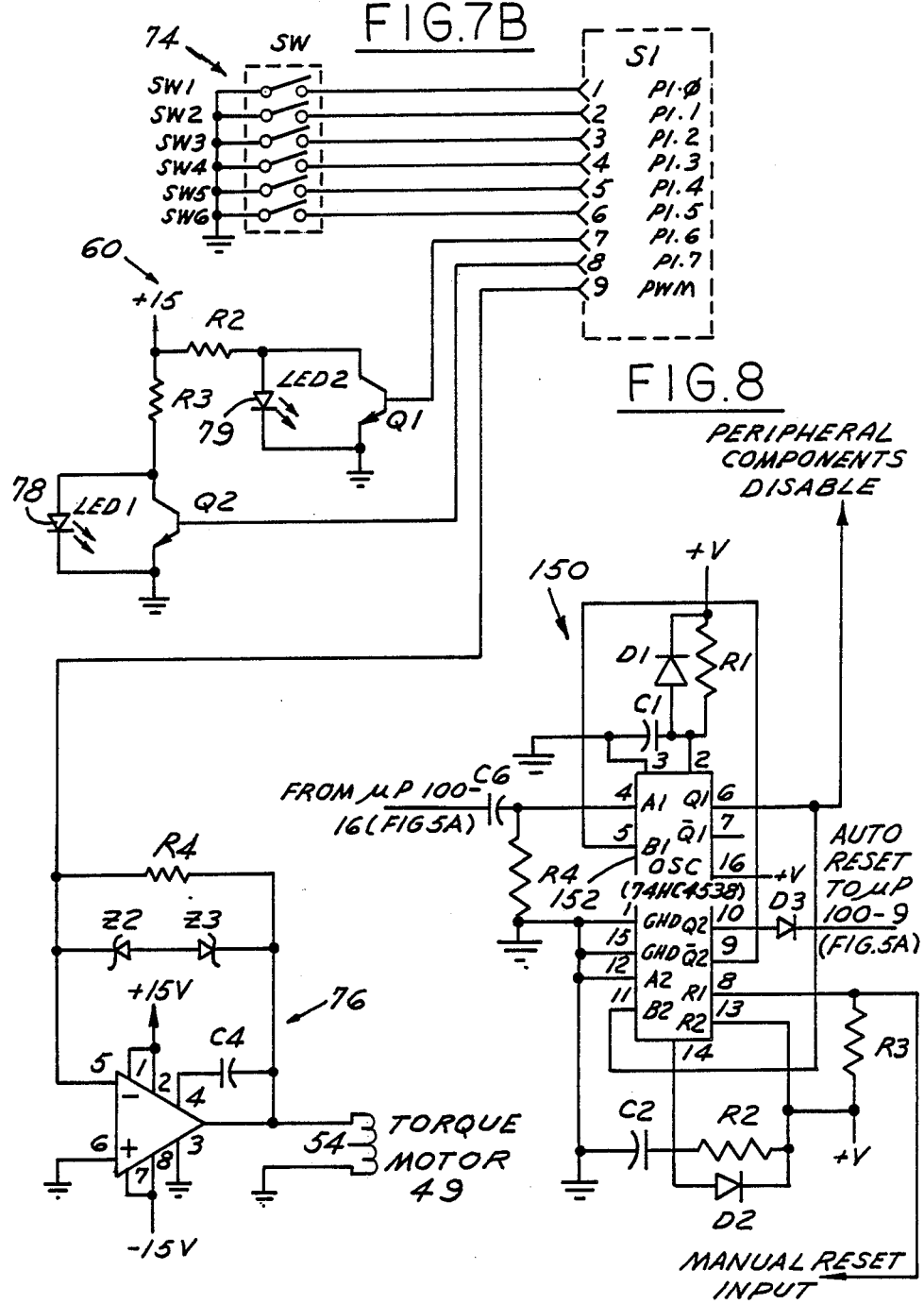

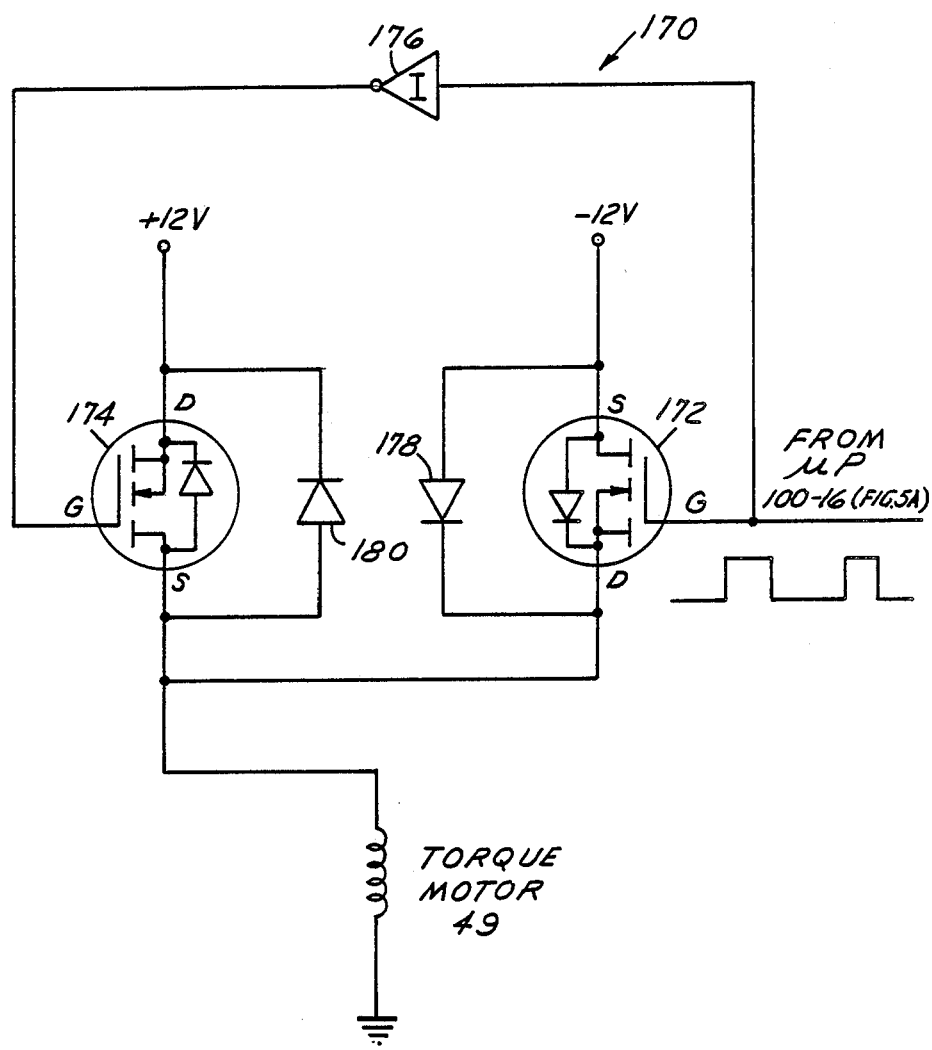

POWER TRANSMISSION

This application is a continuation-in-part of application Ser. No. 849,540 filed Apr. 8, 1986 and now abondoned.

The present invention is directed to electrohydraulic servo systems, and more particularly to an electrohydraulic servo valve assembly for use in such systems.

BACKGROUND AND OBJECTS OF THE INVENTION

In electrohydraulic systems which include a plurality of electrohydraulic devices, such as servo actuators, motors and pumps, it is conventional practice to couple all of such devices to a remote master controller for coordinating or orchestrating device operation to perform a desired task. Motors and actuators may be employed, for example, at several coordinated stages of a machine tool line for automated transfer and machining of parts at a series of workstations. In accordance with conventional practice, the master controller may comprise a programmable controller or the like coupled through individual digital-to-analog converters to the various remotely-positioned electrohydraulic devices for supplying control signals thereto. For closed-loop operation, a sensor is positioned at each electrohydraulic device for sensing operation thereof, and feeds a corresponding signal to the master controller through an analog-to-digital converter.

Thus, in a system which embodies a plurality of electrohydraulic devices, a substantial quantity of electrical conductors must be provided for feeding individual control signals to the various devices and returning sensor signals to the master controller. Such conductors interfere with system design and operation, and are subject to failure. The bank of d/a and a/d converters for feeding signals from and to the master controller add to the expense and complexity of the overall system. Perhaps most importantly, system performance is limited by capabilities of the master controller. For example, a programmable controller may require one hundred milliseconds to scan a device sensor signal, compute a new control signal and transmit such control signal to the remote device. Such overburdened programmable controller operations are not acceptable in high performance applications which may require a six millisecond response time, for example, at each of a plurality of remote devices.

It is therefore a general object of the present invention to provide an electrohydraulic servo system which exhibits the fast response time necessary for high performance applications, while at the same time reducing cost and complexity which inhere in prior art system of the character described above. In furtherance of the foregoing, a more specific object of the invention is to provide a system of the described character wherein each of the system electrohydraulic devices embodies microprocessor-based control adapted to communicate with a central or master controller and for thereby distributing control of the several electrohydraulic devices while maintaining overall coordination thereamong.

Electrohydraulic servo valves are conventionally employed for controlling operation of hydraulic devices, such as rotary actuators, linear actuators and hydraulic motors for example. Such servo valves are conventionally controlled by remotely positioned master electronics as described hereinabove, whether operating individually or as part of a coordinated system. A further object of the present invention, therefore, is to provide an electrohydraulic servo valve assembly which embodies on-board microprocessor-based control electronics. In furtherance of the foregoing, as well as the system objectives previously set forth above, yet another object of the invention is to provide an electrohydraulic servo valve assembly which includes facility for connection to the sensor on the device with which the servo valve is associated for facilitating local closed-loop servo control of the same, while at the same time embodying facility for communication with a remote master controller to obtain coordinated operation with other system devices.

In systems which embody a servo valve coupled to a hydraulic actuator, particularly a linear actuator, it is conventional practice to monitor actuator position using an electroacoustic linear displacement transducer marketed by Temposonics, Inc. of Plainview, N.Y., and disclosed in U.S. Pat. No. 3,898,555. This transducer includes a magnet coupled to the actuator piston for motion conjointly therewith, and a electroacoustic waveguide adjacent to the path of the magnet. A current pulse is launched on a wire which extends through the waveguide and coacts with the magnet to launch an acoustic signal within the waveguide. A coupler or mode converter receives such acoustic signal, with the time between the launching of the current pulse and receipt of the acoustic signal being a function of position of the magnetic relative to the waveguide. This transducer is durable, is directly mounted on the actuator cylinder but magnetically rather than physically coupled to the actuator piston, and is capable of providing an accurate indication of actuator piston position. However, conventional electronics for obtaining such position readings are overly complex and inordinately expensive. Furthermore, such electronics are conventionally supplied in a separate package which must be appropriately positioned and protected in the actuator operating environment. Another object of the present invention, therefore, is to provide inexpensive electronics for coupling to actuator position transducers of the described character. In furtherance of the objectives set forth above relative to provision of a servo valve assembly with on-board control electronics, another object of the present invention is to provide transducer interface electronics of the described character which are sufficiently compact for inclusion in such servo valve on-board control electronics package.

Another problem in the art of electrohydraulic servo valve control lies in overcoming effects of temperature on the valve coil. Coil force is proportional to current. Valve coils are conventionally driven by constant current amplifiers so that change in coil resistance due to temperature has little affect. However, such constant current amplifiers are bulky and expensive. Constant voltage amplifiers are preferable in terms of size and expense, but control of current and force becomes a problem. Another object of the present invention is to provide a valve coil arrangement with reduced temperature sensitivity, and which can thus be used with constant voltage amplifiers of the type described. A further object of the invention is to provide improved valve driver electronics characterized by reduced cost, reduced generation of electromagnetic interference, and/or increased safety at the load.

SUMMARY OF THE INVENTION

In accordance with a first important aspect of the present invention, an electrohydraulic servo control system, which includes a plurality of electrohydraulic devices coupled to a remote master controller, is characterized in that each of the electrohydraulic devices includes on-board microprocessor-based control electronics for receiving and storing control signals from the master controller, receiving signals from the device sensor which indicate operation thereof, comparing the sensor signals to the control signals from the master controller, and operating the associated electrohydraulic device as a function of the resulting error signal. The on-board control electronics associated with each electrohydraulic device preferably include facility for bidirectional communication with the master controller for receiving control signals therefrom for coordinated system operation and reporting device status thereto. The individual control electronics in the preferred embodiments of the invention further include facility for individually and selectively addressing the device microprocessors, and for remote selection among a plurality of control programs prestored in the device control microprocessor memory. In preferred embodiments of the invention wherein the electrohydraulic devices are controlled by pulse width modulated error signals, the microprocessor-based control electronics further include a watchdog timer which monitors the pulse width modulated control signal to the hydraulic device and causes program restart in the absence of such signal.

In accordance with another aspect of the present invention, an electrohydraulic servo valve assembly includes a manifold having openings for connection to a source of hydraulic fluid and to a hydraulic load, such as an actuator or hydraulic motor. A valve element is variably positionable in the manifold for controlling flow of fluid among the manifold openings. A torque motor is mounted on the manifold for receiving valve control signals, and is electromagnetically coupled to an armature which is responsive to signals in the stator for variably positioning the valve element within the manifold. Microprocessor-based control electronics are mounted to the manifold beneath a cover which encloses and protects both the control electronics and the armature/stator assembly. The control electronics include facility for receiving and storing control signals from an external source, and for generating valve control signals to the valve torque motor. In the preferred embodiments of the invention, such microprocessor-based control electronics include the addressability, bidirectional communication and watchdog-timer features previously discussed.

A further aspect of the present invention, which finds particular application in a servo-valve/linear-actuator combination, features improved circuitry for monitoring operation of the Temposonics electroacoustic transducer previously discussed. In accordance with this aspect of the present invention, electronics for monitoring operation of such sensor include facility for launching the initial current pulse in the waveguide in response to a measurement demand from the microprocessor-based control electronics, and for simultaneously resetting a counter. Upon receipt of the acoustic return pulse from the waveguide, the counter is automatically incremented and a current pulse is relaunched in the waveguide. The output of the counter includes facility for preselecting a number of launch/return cycles in the waveguide, and for generating an interrupt signal to the microprocessor-based control electronics to indicate that the preselected number of recirculations has been reached and that an actuator position reading has been obtained and stored in a clock which measures the amount of time between the initial measurement demand signal and the interrupt signal. The clock output is stored and transmitted to the control microprocessor on demand. In the preferred embodiments of the invention herein disclosed, such sensor electronics are combined with microprocessor-based control electronics and valve drive electronics in a compact package which forms part of an electrohydraulic servo valve assembly coupled to the monitored actuator.

BRIEF DESCRIPTION OF THE DRAWINGS

The invention, together with additional objects, features and advantages thereof, will be best understood from the following description, the appended claims and the accompanying drawings in which:

FIGS. 6A and 6B together comprise an electrical schematic diagram of the sensor board in the valve assembly as illustrated in FIG. 2;

FIGS. 7A and 7B together comprise an electrical schematic diagram of the power/display/driver board in the valve assembly as illustrated in FIG. 2;

FIG. 8 is a fragmentary electrical schematic diagram of a modified embodiment of the microprocessor watchdog electronics illustrated in FIG. 5A;

FIG. 10 is an electrical schematic diagram of a modified valve driver in accordance with the invention.

DETAILED DESCRIPTION OF PREFERRED EMBODIMENTS

Figure 1:
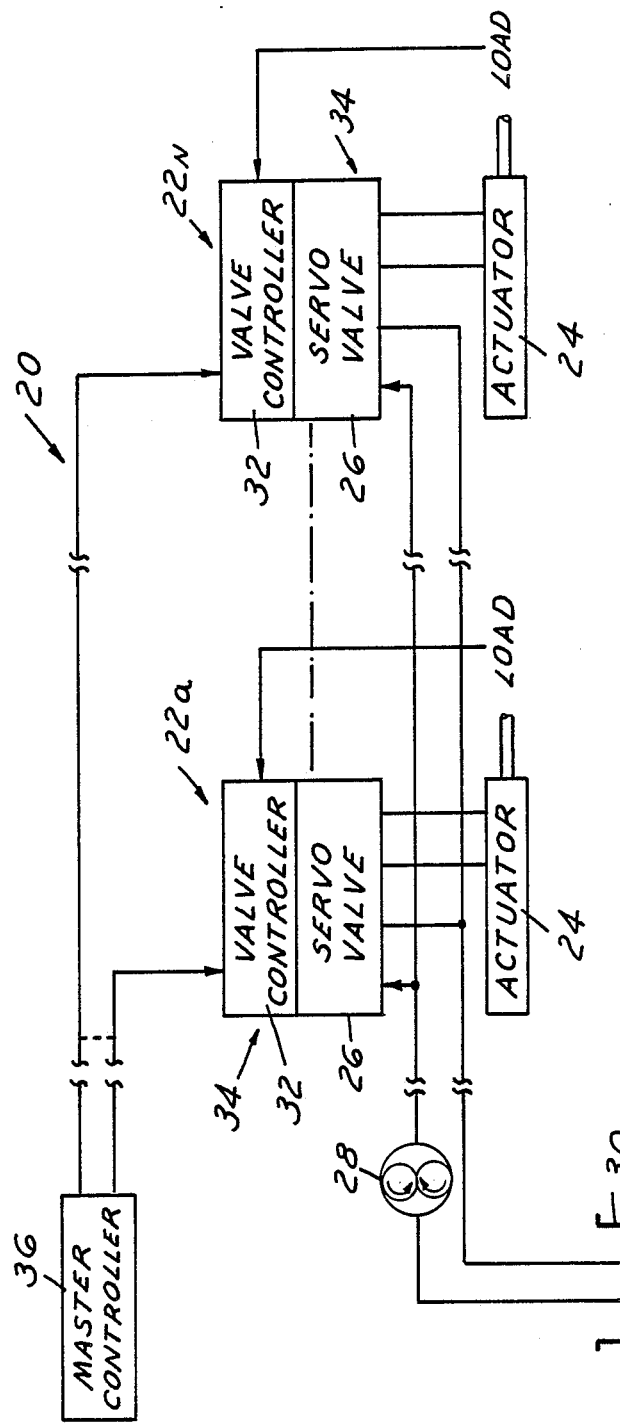
FIG. 1 is a functional block diagram of an electrohydraulic system in accordance with one aspect of the present invention.

FIG. 1 illustrates an electrohydraulic system 20 which features distributed servo control in accordance with a first important aspect of the present invention. A plurality of electrohydraulic devices 22a–22n are illustrated as each individually comprising a linear actuator 24 coupled to a load. Each actuator 24 is hydraulically controlled by an associated servo valve 26, with the several valves 26 being connected in the usual manner through a pump 28 to a source 30 of hydraulic fluid. Each servo valve 26 has associated therewith a microprocessor-based electronic valve controller 32 which, in accordance with the preferred embodiments of the invention herein described, is combined with servo valve 26 in a unitary package or assembly 34. Each valve controller 32 receives a feedback signal indicative of operation at the associated actuator 24 and/or the load coupled thereto. A master controller 36 is connected to each valve controller 32 for providing control signals thereto, and thereby coordinating operation of the various actuators 24 in a desired manner in accordance with programming stored in master controller 36. It will be appreciated, of course, that FIG. 1 illustrates only two electrohydraulic devices or implements 22a, 22n of a system which may include a substantial number of such devices. Likewise, it will be appreciated that the system and servo valve aspects of the present invention are not limited to linear actuators 24 of the type illustrated in FIG. 1, but apply equally as well to other controllable hydraulic devices such as pumps, hydraulic motors and rotary actuators, for example.

Figure 2:
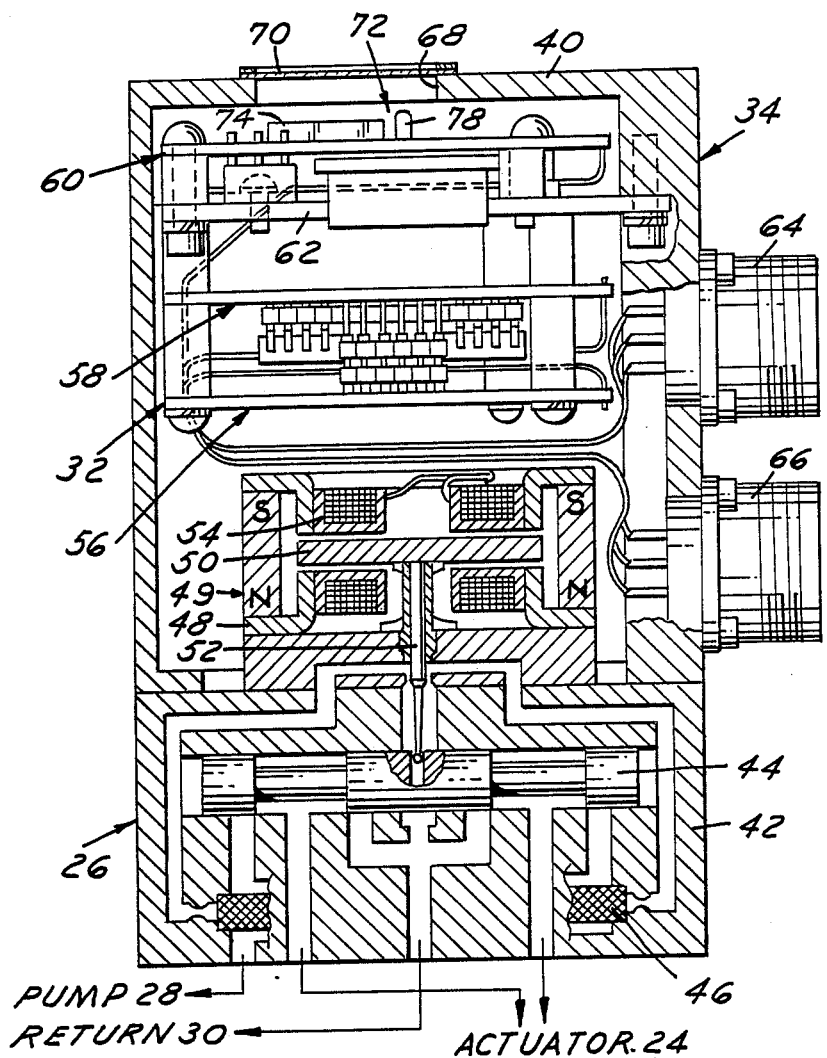
FIG. 2 is a sectioned elevational view of an electrohydraulic servo valve assembly in accordance with another aspect of the present invention.
Figure 3:
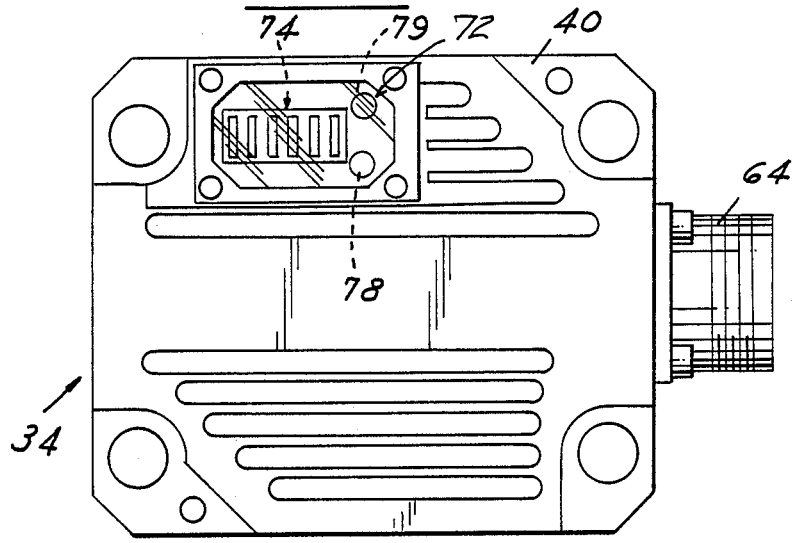
FIG. 3 is a top plan view of the servo valve assembly illustrated in FIG. 2.

FIGS. 2 and 3 illustrate a servo valve assembly 34 wherein microprocessor-based valve controller 32 in accordance with the present invention is mounted by the cover 40 on an otherwise generally conventional servo valve 26. Valve 26 includes a manifold 42 having orifices or passages opening at the lower face thereof for connection to pump 28 (FIG. 1), return 30 and actuator 24. A spool 44 is slidable within manifold 42 for controlling flow of fluid among the various orifices through the filter 46. An electromagnetic torque motor assembly 48 is carried by manifold 42 remotely of the fluid orifices and surrounds an armature 50 which is coupled by the flapper 52 to spool 44. The combination of stator 48 and armature 50, conventionally termed a torque motor 49 in the art, thus slidably controls position of spool 44, and thereby controls fluid transport among the valve orifices, as a function of signals applied to the stator coils 54. Valve controller 32 includes a stacked assembly of three printed circuit board subassemblies: a sensor feedback board 56 (FIGS. 2, 6A and 6B), a microprocessor board 58 (FIGS. 2, 5A and 5B) and a power/display/valve-driver board 60 (FIGS. 2, 7A and 7B). Power/display/driver board 60 is carried by a bracket 62 which is mounted internally of cover 34 such that board 60 is positioned adjacent and parallel to the cover top wall. Boards 56, 58 are mounted as shown in FIG. 2 beneath bracket 62 and adjacent to torque motor 49. Suitable spacers maintain boards 58–60 and bracket 62 in parallel spaced relation as shown. A first connector 64 is affixed to a sidewall of cover 34 for connection of valve controller 32 to master controller 36 (FIG. 1). A second connector 66 on cover 40 adjacent to connector 64 provides for coupling of controller 32, specifically sensor feedback board 56, to the actuator position sensor. An aperture or opening 68 in the top wall of cover 40 is externally covered by a removable translucent panel 70 to afford viewing of a controller LED display 72 (FIGS. 2–4 and 7B) and access to controller station access switches 74 for purposes to be described.

In the preferred application where a servo valve power stage is controlled by an electro-magnetic-mechanical torque motor driven pilot stage, the temperature coefficients of the coils are reduced, allowing the use of simpler voltage mode driver electronics, by winding the coils with a low temperature-coefficient wire. By using a "60 Alloy" wire with a temperature coefficient of resistance of 550 parts per million per degree C, a 1.65% coil resistance increase would occur over a thirty degree C temperature rise, as compared with a 12% resistance increase in conventional copper coils over the same temperature range. In applications, such as the preferred servo valve application, where the servo valve component itself exhibits a positive gain shift, the coil temperature coefficient of resistance can be selected to nearly exactly compensate for the valve positive gain shift. In the case of the servo valves, a 1.5% gain increase is observed over the same thirty degree C temperature range. The subject servo valve family can therefore be electrically driven in a voltage mode with no electronic compensation simply by implementing this temperature compensating coil. Low temperature coefficient wire materials also exhibit higher bulk resistivity, usually of the same order of magnitude as the reduction in temperature coefficient as compared to copper wire. For this reason higher voltages are required to drive the same coil application for a given coil space envelope, at the cost of higher coil power dissipation. In the case of the preferred servo valve application the power dissipation is very small, providing an excellent opportunity to exploit this technique. This temperature (/gain) compensated coil means can also be implemented in a pulse width modulated mode where the voltage duty cycle is varied to modulate the average current in the coil(s), as in the preferred application.

Figure 4:
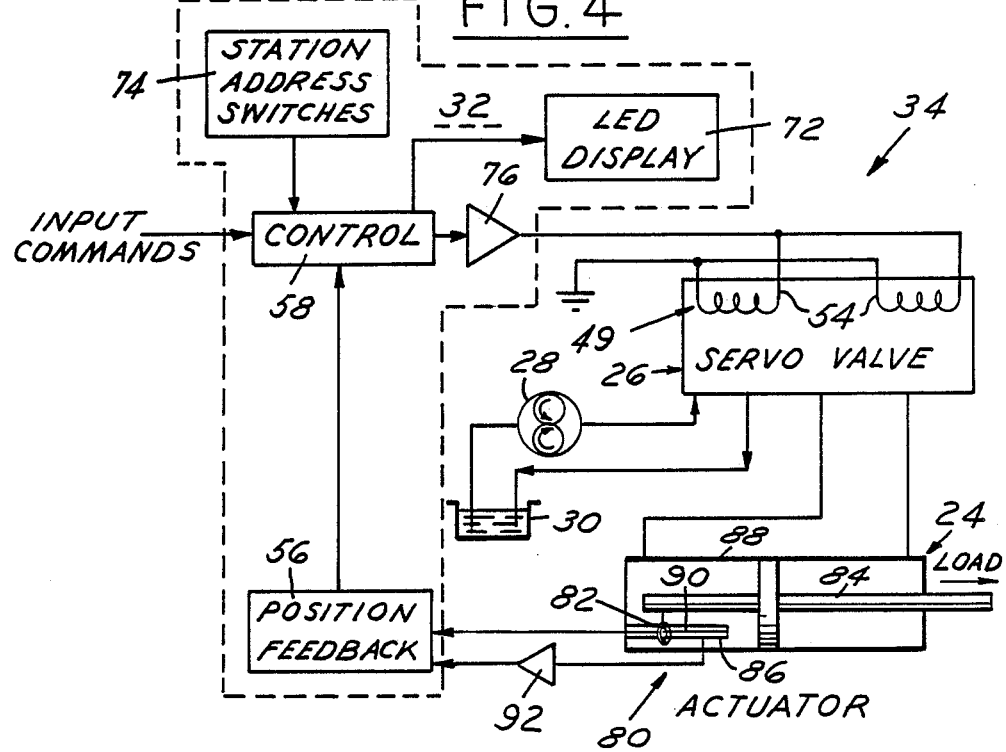
FIG. 4 is a functional block diagram of the servo valve assembly illustrated in FIGS. 2–3 coupled to a source of hydraulic fluid and to a linear hydraulic actuator.

FIG. 4 is a schematic and functional block diagram of servo valve assembly 34 coupled to an actuator 24 and a position transducer 80. Control electronics on microprocessor board 58 receive input commands from master controller 36 (FIG. 1) and provide a pulse width modulated output to coils 54 of servo valve torque motor 49 through an amplifier 76 (FIGS. 4 and 7B) carried by power/display/driver board 60. Switches 74 preferably comprise a conventional multiple-pole dip-switch assembly carried by power/display/driver board 60 and coupled to microboard 58 for setting a unique address at which master controller 26 may communicate with valve controller 34. LED display 72 includes a first LED 78 (FIGS. 2–3 and 7B) which is continuously alternately energized and de-energized by micro control 58 at fixed frequency to indicate continuing operation of servo valve assembly 34. That is, either continuous illumination or continuous extinction of LED 78 indicates malfunction at the servo valve assembly and/or its associated actuator 24. A second LED 79 (FIGS. 3 and 7B) is energized during communication between associated control electronics 58 and master controller 36 (FIG. 1). Actuator position transducer 80 is schematically illustrated in FIG. 4 as comprising an annular magnet 82 carried by actuator piston 84. An electroacoustic waveguide 86 is carried by the cylinder 88 of actuator 24 and is encircled by magnet 82. A conductor 90 projects into waveguide 86 and is connected to position feedback electronics carried by sensor feedback board 56 for receiving current pulses therefrom. A mode converter or coupler 92 is responsive to acoustic or sonic signals within waveguide 86 to provide a corresponding electronic return signal to feedback electronics 56. As previously noted hereinabove, the general construction and operation of transducer 80 is illustrated in greater detail in U.S. Pat. No. 3,898,555, the disclosure of which is incorporated herein by reference.

Figure 5A:
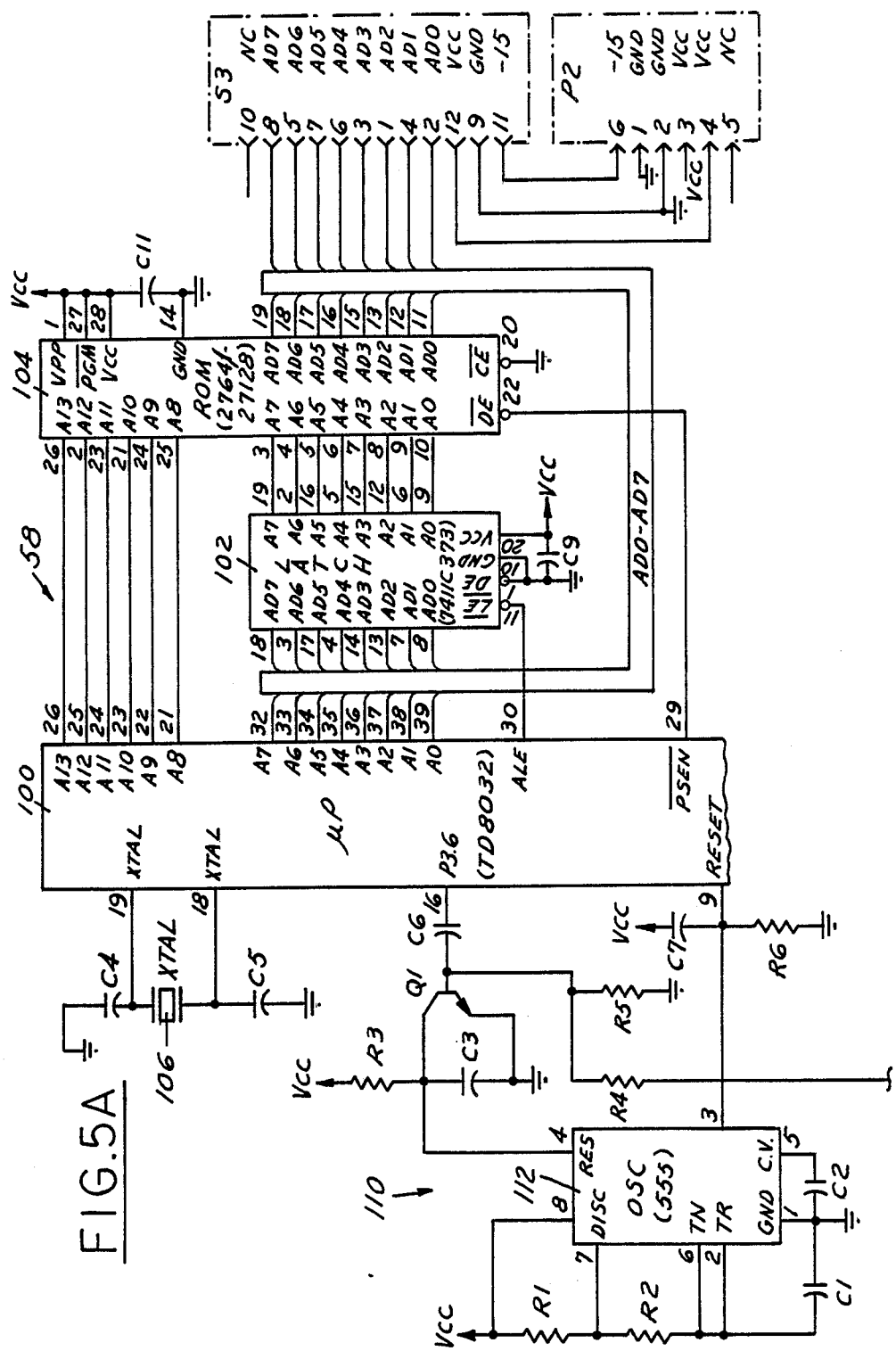
FIGS. 5A and 5B together comprise an electrical schematic diagram of the microprocessor board in the valve assembly as shown in FIG. 2.
Figure 5B:
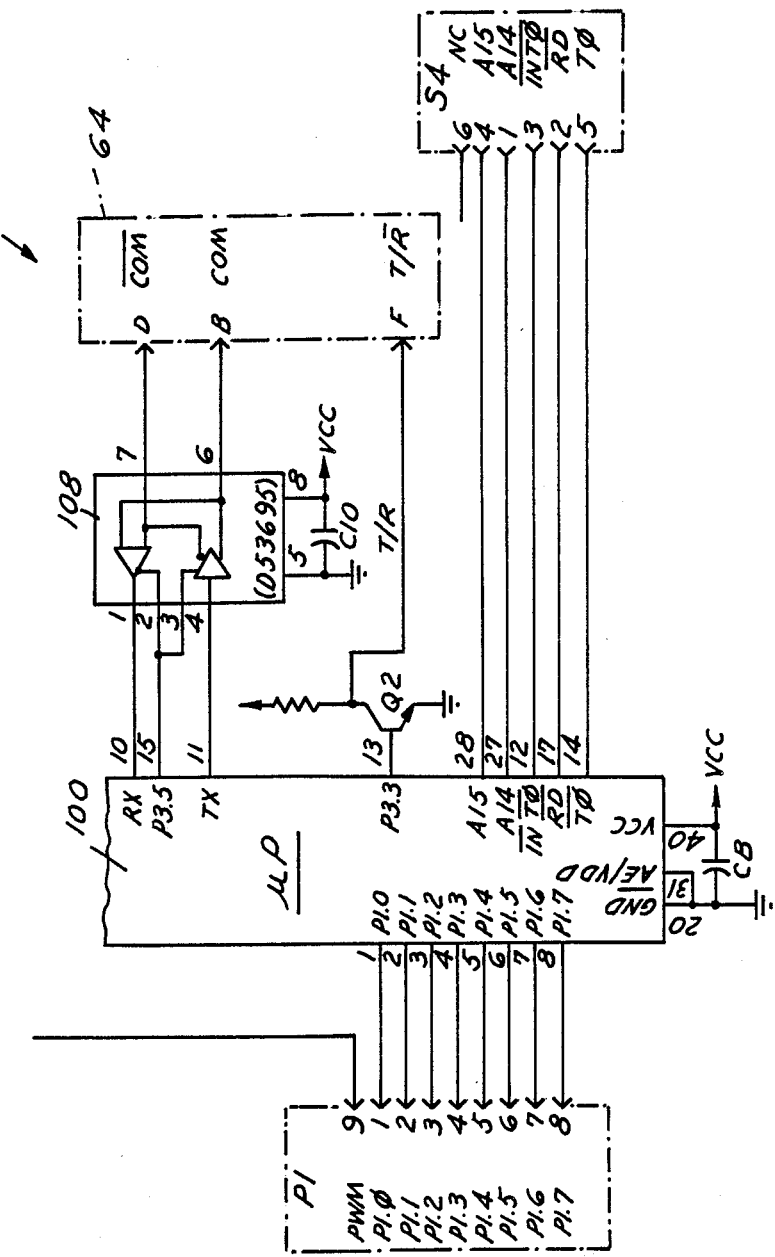
Figure 6A:
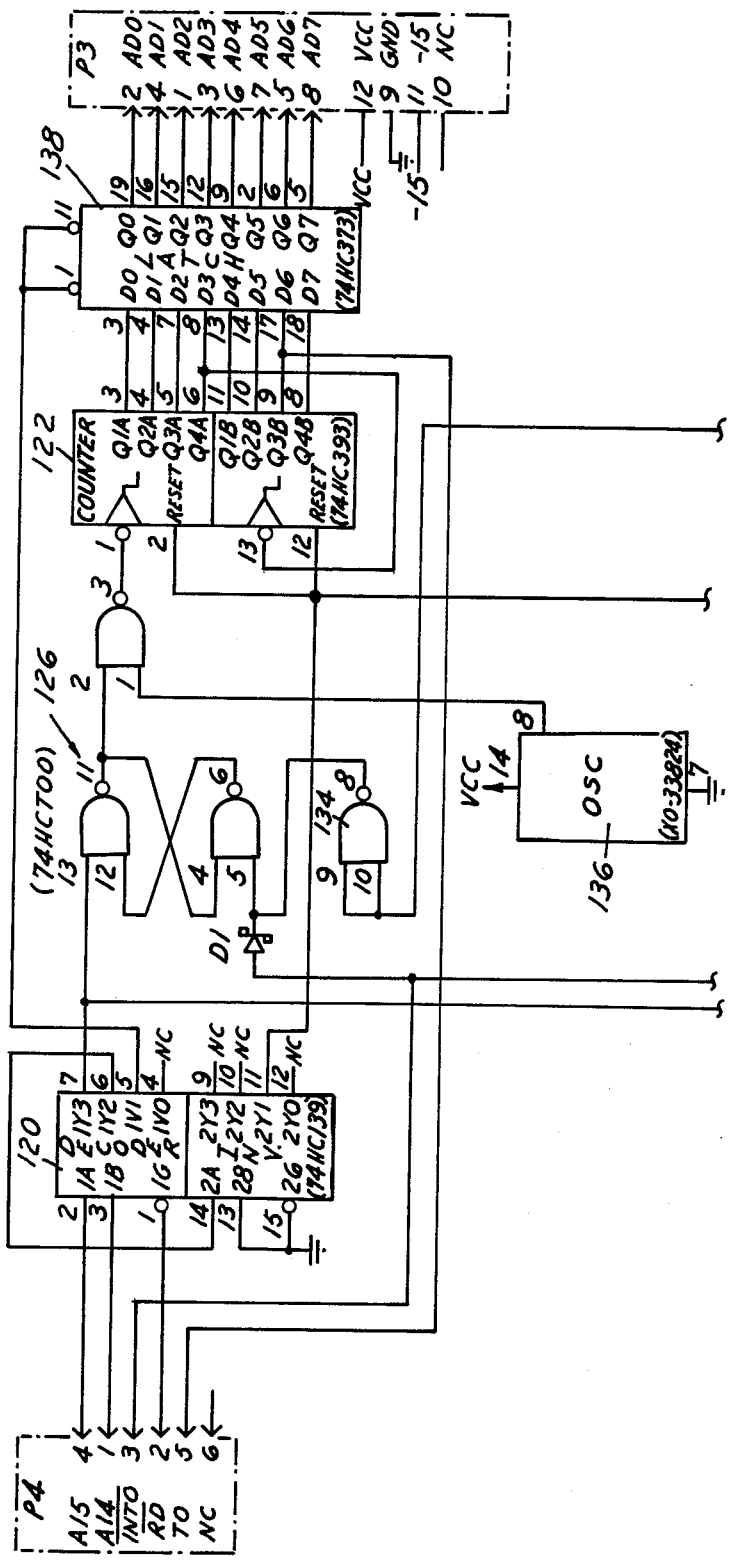

FIGS. 5A–7B collectively illustrate the electronics of valve controller 32, FIGS. 5A and 5B illustrating microprocessor board 58, FIGS. 6A and 6B illustrating sensor feedback board 56, and FIGS. 7A and 7B illustrating power/display/driver board 60. The various printed circuit boards 56–60 are interconnected in assembly 32 by plugs P and sockets S carried by the individual circuit boards. In the schematic drawings of FIGS. 5A-7B, interconnected plugs P and sockets S are designated by corresponding suffix numerals—i.e. plug P2 in FIG. 5A is connected in assembly to socket S2 in FIGS. 7A, etc. The major integrated circuit components in FIGS. 5A-7B bear standard component identifications in parentheses, such identifications being by way of example only. Individual components, e.g. resistors, capacitors and transistors, are numbered in sequence on each board in keeping with conventional practice, so that identical identification between boards does not necessarily indicate identical components.

Turning to FIGS. 5A and 5B, microprocessor printed circuit board 58 includes a microprocessor 100 having address terminals coupled, either directly or through a latch 102, to a ROM 104. Most preferably, ROM 104 has stored therein, as firmware, one or more programs for controlling actuator 24 in various modes of operation. These control programs are selectable by master controller 36. A crystal 106 is coupled to the clock inputs of microprocessor 100 for establishing microprocessor timing. A differential receiver/transmitter module 108 (FIG. 5B) is coupled between connector 64 (FIGS. 2, 3 and 5B) and microprocessor transmit and receive terminals TX, RX for receiving and storing control signals from master controller 36 (FIG. 1) or transmitting station status information to master controller 36. Microprocessor 100 also supplies a transmit/receive signal T/R to connector 64 to indicate whether the microprocessor is in the transmit or receive communication mode. Exemplary control programs are disclosed in the following copending applications, all of which are assigned to the assignee hereof: Ser. Nos. 849,542 filed Apr. 8, 1986, 684,265 filed Dec. 20, 1984, 709,134 filed Mar. 7, 1985, 740,481 filed June 3, 1985 and 765,796 filed Aug. 15, 1985.

Torque motor 49 (FIG. 2) is constructed to control position of spool 44 as a function of the duty cycle of pulse width modulated signals applied to stator coils 54. Such pulse width modulated signals are supplied at the P3.6 output of microprocessor 100 to amplifier 76 (FIGS. 4 and 7B) on power/display/driver board 60. A watchdog timer 110 includes an NPN transistor Q1 coupled to the pulse width modulated control output of microprocessor 100 through the isolation capacitor C6. A capacitor C3 is connected across the collector and emitter of transistor Q1, with the emitter being connected to ground and the collector being connected through the resistor R3 to the positive voltage supply. An oscillator 112 receives an enable/disenable input from the collector of transistor Q1. The timing terminals of oscillator 112 are connected in the usual manner to resistors R1, R2 and capacitors C1, C2 to provide a continuous pulsed output to the reset input of microprocessor 100 in the absence of a disenabling reset input. As long as the pulse width modulated output of microprocessor 100 remains above a preselected frequency, determined by the values of resistor R3 and capacitor C3, transistor Q1 will prevent capacitor C3 from charging to a voltage level which will permit operation of oscillator 112. However, should the frequency or amplitude of the microprocessor pulse width modulated output decrease below the alarm levels determined by resistor R3 and capacitor C3, capacitor C3 will charge to a higher voltage level which, when applied to the reset input of oscillator 112, permits oscillator operation so as to pulse the reset input of microprocessor 100 and thereby terminate servo control operation. Absence of pulse width modulated control signals to torque motor 49 (FIG. 2) automatically returns spool 44 to its neutral or centered position illustrated in FIG. 2 and thereby prevents uncontrolled or runaway operation of actuator 24. Reinitiation of the pulse width modulated output of microprocessor 100 at the desired frequency and voltage level discharges capacitor C3 (FIG. 5A) through transistor Q1 and thereby disenables or inhibits further operation of oscillator 112 so as to terminate reset inputs to microprocessor 100.

FIGS. 6A and 6B illustrate the sensor position feedback electronics on circuit board 56 as comprising a decoder 120 which receives and decodes a measurement command input from microprocessor 100 (FIG. 5B), and provides corresponding outputs first to reset a pair of counters 122 (FIG. 6A) and 124 (FIG. 6B) and then to set a flip-flop 126 for enabling operation of counter 122. A oneshot 128 (FIG. 6B) is simultaneously triggered through a diode D3 to provide a first pulsed output for incrementing counter 124 and a second pulsed output for triggering a second oneshot 130. Either the high-going or the low-going output of oneshot 130 is fed by a suitable jumper at plug P5 through resistor R10 to connector 66 for selecting either positive or negative polarity for the current pulse transmitted by oneshot 130 to position transducer 80. Return or echo signals from mode convertor 92 (FIG. 4) of transducer 80 are fed through connector 66 to an amplifier 132. The output of amplifier 132 is connected through a diode D2 and ORed with the output of decoder 120 at the trigger input of oneshot 128.

Thus, a measurement command signal from the control microprocessor first resets counters 122, 124 and then triggers oneshots 128, 130. Oneshot 130 propagates an initial current pulse along the conductor of sensor 80 at polarity selected by plug P5, while oneshot 128 increments counter 124. Upon receipt of an echo or return signal from the transducer at a level above that set by resistors R2, R3, amplifier 132 retriggers oneshot 128 so as to increment counter 124 and retrigger oneshot 130 to propagate a second current pulse at the position transducer. Thus, each return signal sensed at amplifier 132 functions to propagate a further current pulse and to increment counter 124, such that the counter continuously indicates the number of transducer propagation/return cycles. Preferably, the duration of the pulsed output of oneshot 128 is made relatively long, such as fifteen microseconds for example, as compared with the duration of oneshot 130, such as one microsecond. Oneshot 128 thus functions to mask false echo signals which occasionally occur when the the transducer current pulse is initially propagated.

Counter 124 has a plurality of count-indicating outputs, a selected one of which is connected through an inverter 134 (FIG. 6A) to reset counter-enable flip-flop 126. The output of inverter 134 is also connected through a diode D1, plug P4 and socket S4 to an interrupt input of microprocessor 100 (FIG. 5B) so as to indicate completion of a transducer measurement cycle. The output of flip-flop 126 enables connection of a high frequency oscillator 136 to the count input of counter 122. Thus, counter 122 and oscillator 136 effectively form a digital clock which measures the time duration of the transducer measurement sequence. A latch 138 has data inputs connected to the outputs of counter 122 and has load inputs connected to decoder 120. A read command signal from microprocessor 100 (FIG. 5B) to decoder 120 loads the output of counter 122 into latch 138 so as to present such position-indicating count output to microprocessor 100 through plug P3 (FIG. 6A) and socket S3 (FIG. 5A). Thus, in operation, current pulses are sequentially propagated and return signals received over a number of cycles determined by the output connection to counter 124, and counter 122 measures the total time duration of the several cycles. Use of multiple cycles rather than a single cycle provides enhanced measurement resolution. The number of measurement cycles is selected at a function of range of position measurements and desired resolution, as well as desired speed of the overall measurement operation.

FIGS. 7A and 7B illustrate circuitry on power/display/driver board 60. In particular, FIG. 7A illustrates a power supply 140 for supplying power to the remainder of the control electronics. It will be noted that input power is received from master controller 36 through connector 64. Power is supplied to position transducer 80 through connector 66. Thus, in the event of loss of connection to master controller 36, power is automatically removed from valve torque motor 49 (FIG. 2) so that spool 44 and actuator 24 automatically return to the null position. Of course, ROM 104 (FIG. 5A) is nonvolatile so that control programming is not lost in the event of power loss. FIG. 7B illustrates address switches 74 connected to the microprocessor control electronics through socket S1 and plug P1 (FIG. 5B). By removal of panel 70 (FIGS. 2–3), an operator may select unique addresses for each of the valve controllers 32 (FIG. 1) so that master controller 36 can communicate therewith. Programming suitable for controlling microprocessor 100 (FIG. 5A) to perform the operations hereinabove described will be self-evident to the artisan in view of such detailed description.

In valve driver 76, an operational amplifier has one input which receives differentiated pulses from the highpass filter C6, R5 (FIG. 5A) and a second input referenced to ground. The amplifier output thus alternately switches from positive to negative under control of the pulse width modulated signal. It will be noted that, in the absence of such control signals, the amplifier output is at ground, centering spool 44 in manifold 42 and arresting all motion. The minimum pulse frequency is set by capacitor C6 (FIG. 5A). The back-to-back zener diodes Z2, Z3 across the amplifier limit output voltage to ±12 volts without requiring separate supply regulation. Inherent amplifier slew rate eliminates EMI problems. It will also be noted that driver 76 is a single-input driver, not requiring a separate direction - control input.

FIG. 8 illustrates a watchdog timer 150 which may be employed in place of timer 110 (FIG. 5A) in the preferred embodiment of the invention. Watchdog timer 150 includes an oscillator 152 which receives the pulse width modulated output of microprocessor 100 (FIG. 5A) through capacitor C6 to disenable or inhibit oscillator operation as long as the frequency of such microprocessor output remains above a threshold level set by resistor R1 and capacitor C1. When oscillator operation is enabled, a continuous train of pulsed reset signals at a frequency determined resistor R2 and capacitor C2 is supplied to the reset input of the control microprocessor. The watchdog timer 150 of FIG. 8 further embodies a separate non-pulsed output for disabling peripheral components, and includes facility for a manual reset input from and operator switch or the like.

Figure 9:
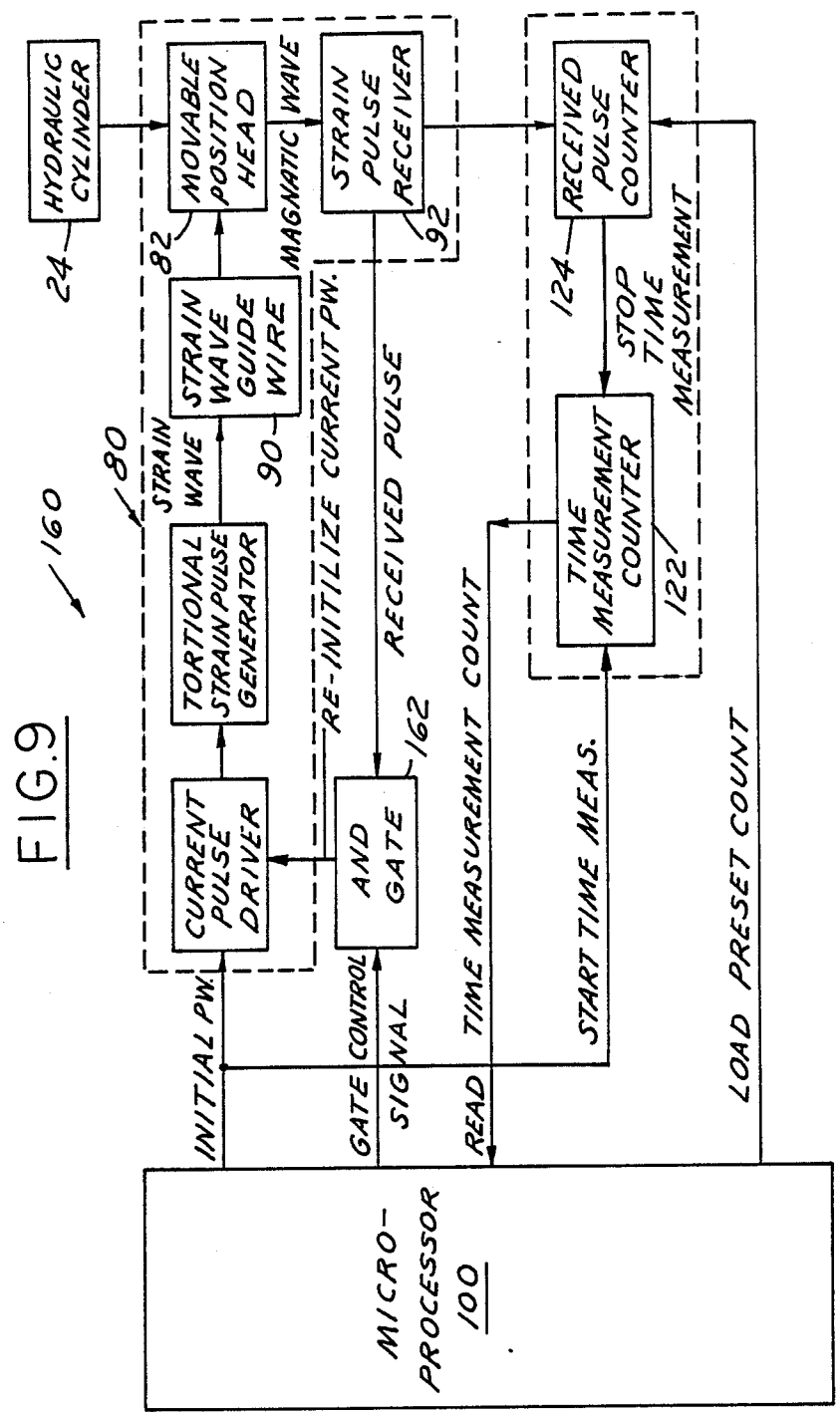
FIG. 9 is a functional block diagram of an alternative embodiment of the sensor electronics illustrated in FIGS. 6A and 6B.

FIG. 9 is a functional block diagram of position sensor electronics which may be employed in place of the electronics of FIGS. 6A and 6B in the preferred embodiment of the invention. In general, electronics 160 of FIG. 9 differ from that in the preferred embodiment of the invention hereinabove discussed primarily in that electronics 160 is more directly controlled by microprocessor 100. The microprocessor initiates a current pulse in transducer 80, and at the same time enables operation of time measurement counter 122. Each return signal reinitializes a current pulse in transducer 80 and simultaneously increments a pulse or a cycle counter 124. When the count in counter 124 reaches the value preset directly by microprocessor 100, operation of counter 122 is terminated and microprocessor 100 is so advised. Microprocessor 100 may then inhibit propagation of further current pulses at gate 162 and read the output of counter 122 for obtaining a position signal.

FIG. 10 illustrates a valve driver 170 which may be employed in place of driver 76 (FIGS. 4 and 7B). A first power MOSFET 172 has a gate which receives pulse width modulated valve control signals from pin 16 of microprocessor 100 (FIG. 5A), a source connected to a negative voltage supply and a drain connected to torque motor 49. A second power MOSFET 174 has a gate connected to the gate of MOSFET 172 through an inverter 176, a drain connected to the positive supply and a source connected to torque motor 49. Diodes 178, 180 are connected across MOSFETs 172, 174 to limit reverse voltage spikes. In operation, MOSFETs 172, 174 alternately connect the respective supplies to torque motor 49 as a function of polarity of the input signal from microprocessor 100 (FIG. 5A). Driver 170 has the advantage of lower cost as compared with driver 76 and conventional drivers, and would be advantageously employed in the environment of all-digital electronics where EMI is less of a problem.

The invention claimed is:

1. An electrohydraulic system with distributed control comprising a plurality of electrohydraulic devices each including means responsive to a pulse width modulated electronic signal for performing an associated hydraulic operation and sensing means for sensing operation of the associated device and providing a sensor signal as a function of such operation, and master control means coupled to all of said devices for coordinating operation of said devices, each of said plurality of devices comprising an assembly having on-board microprocessor-based device control means including means for receiving and storing control signals from said master control means, means for receiving said sensor signal indicating operation of the associated said device, means for comparing said sensor signal to said control signals to generate pulse width modulated error signals, means for operating the associated said electrohydraulic device as a function of said pulse width modulated error signals, means for specifying a communication address unique to each said device control means, said master control means being connected to all of said device control means for communication of said control signals to said device control means individually as a function of associated device address, and a watchdog timer connected to receive said pulse width modulated signals and responsive to absence of such signals to indicate an error condition.

2. The system set forth in claim 1 wherein each said device control means includes means for bidirectional communication with said master control means, including means for transmitting signals to said master control means indicating status of the associated device.

3. The system set forth in claim 1 wherein said address-specifying means comprises a plurality of operator switch means, said device control means including means responsive to collective states of said switch means for compiling an address code for the associated device.

4. The system set forth in claim 1 wherein said error signal-generating means includes memory means for storing predetermined programs for controlling operation of said device, and wherein said microprocessor-based device control means includes means responsive to control signals from said master controller for selecting among said predetermined programs for generating said error signals and thereby controlling operation of said device.

5. The system set forth in claim 1 wherein each said device controller includes display means for continuously indicating operation of the associated device.

6. The system set forth in claim 5 wherein said display means comprises first illumination means and means for continuously alternately energizing and de-energizing said first illumination means, such that continuous illumination or continuous extinction of said first illumination means indicates malfunction at said device.

7. The system set forth in claim 6 wherein said display means further comprises second illumination means for indicating pendency of communication between said master control means and the associated device.

8. The system set forth in claim 1 wherein said watchdog timer comprises a controlled oscillator responsive to absence of said pulse width modulated signals for a predetermined time duration for resetting said device control means, and to resumption of said pulse width modulated signals for enabling operation of said device control means.

9. An electrohydraulic servo valve assembly comprising a servo valve including a manifold having openings for connection to a source of hydraulic fluid and to a load, a valve element variably positionable in said manifold for controlling flow of fluid among said openings, a stator mounted on said manifold for receiving valve control signals, an armature coupled to said valve element and responsive to said stator for variably positioning said valve element within said manifold, and a cover mounted on said manifold for enclosing said armature and stator, and microprocessor-based control means mounted on said manifold within said cover, said control means including means for receiving and storing control signals from an external source, means for receiving signals from a sensor coupled to said load to indicate operation at said load, means for comparing said sensor signals to said control signals for generating error signals, and means responsive to said error signals for generating said valve control signals to said stator, said microprocessor-based control means comprising a plurality of printed circuit board assemblies mounted in stacked orientation internally of said cover, said means for receiving and storing said control signals from an external source comprising switch means carried by one of said printed circuit board assemblies adjacent to said cover and means responsive to collective states of said switch means for establishing a numerical address associated with said control means for communication with such external source, said cover including a removable panel adjacent to said switch means for affording access thereto.

10. The servo valve assembly set forth in claim 9 wherein said panel is translucent, and wherein said control means further comprises optical display means carried by said one of said printed circuit board assemblies adjacent to said switch means beneath said panel for indicating operation of said servo valve assembly.

11. The system set forth in claim 10 wherein said optical display means comprises first illumination means and means for continuously alternately energizing and de-energizing said first illumination means, such that continuous illumination or continuous extinction of said first illumination means indicates malfunction at said device.

12. The system set forth in claim 11 wherein said optical display means further comprises second illumination means for indicating pendency of communication between said master control means and an external source of control signals.

13. The servo valve assembly set forth in claim 9 wherein said error signal-generating means includes memory means for storing predetermined programs for controlling operation of said servo valve, and wherein said microprocessor-based control means includes means responsive to control signals from an external source for selecting among said predetermined programs for generating said error signals and thereby controlling operation of said servo valve.

14. The servo valve assembly set forth in claim 9 wherein said servo valve is responsive to pulse width modulated control signals to said stator for controlling position of said valve element, characterized in that said error signal-generating means comprises means for generating said pulse width modulated control signal, and in that said microprocessor-based control means further comprises a watchdog timer connected to receive said pulse width modulated control signals and responsive to absence of such signals to indicate an error condition.

15. An electrohydraulic servo valve assembly comprising a servo valve including a manifold having openings for connection to a source of hydraulic fluid and to a load, a valve element variably positionable in said manifold for controlling flow of fluid among said openings, a stator mounted on said manifold for receiving valve control signals, an armature coupled to said valve element and responsive to said stator for variably positioning said valve element within said manifold, and a cover mounted on said manifold for enclosing said armature and stator, and microprocessor-based control means mounted on said manifold within said cover, said control means including means for receiving and storing control signals from an external source, means for receiving signals from a sensor coupled to said load to indicate operation at said load, means for comparing said sensor signals to said control signals for generating error signals, and means responsive to said error signals for generating said valve control signals to said stator, said servo valve being responsive to pulse width modulated control signals to said stator for controlling position of said valve element, said error signal-generating means comprising means for generating said pulse width modulated control signal, and said microprocessor-based control means further comprising a watchdog timer connected to receive said pulse width modulated control signals and responsive to absence of such signals to indicate an error condition.

16. The system set forth in claim 15 wherein said watchdog timer comprises a controlled oscillator responsive to absence of said pulse width modulated control signals for a predetermined time duration for resetting said control means, and to resumption of said pulse width modulated control signals for enabling operation of said control means.

17. An electrohydraulic servo and actuator system comprising a servo valve including a manifold having openings for connection to a source of hydraulic fluid and to a load, a valve element variably positionable in said manifold for controlling flow of fluid among said openings, a stator mounted on said manifold for receiving valve control signals, an armature coupled to said valve element and responsive to said stator for variably positioning said valve element within said manifold, a cover mounted on said manifold for enclosing said armature and stator, a hydraulic actuator operatively coupled as a load to said manifold openings, and a position sensor coupled to said actuator for providing sensor signals as a function of operation at said load,
   said position sensor comprising magnetic means coupled to said actuator for motion conjointly therewith, waveguide means adjacent to said magnetic means in fixed position relative to travel of said magnetic means, means for launching current pulses in and receiving acoustic return pulses from said waveguide means, and means for determining position of said magnetic means with respect to said waveguide means and thereby determine position of said actuator, and
   microprocessor-based control means mounted on said manifold within said cover, said control means including means for receiving and storing control signals from an external source, means for receiving said sensor signals to indicate operation at said load, means for comparing said sensor signals to said control signals for generating error signals, and means responsive to said error signals for generating said valve control signals to said stator,
   said position-determining means comprising a counter, means responsive to a measurement signal from said microprocessor-based control means for resetting said counter and launching an initial current pulse in said waveguide means, means responsive to acoustic return pulses from said waveguide means for incrementing said counter and relaunching current pulses in said waveguide means, means coupled to said counter for indicating a preselected count in said counter corresponding to a preselected number of launch/return cycles at said waveguide means and for generating an interrupt signal to said microprocessor-based control means, a clock responsive to said measurement signal and to said interrupt signal for measuring time duration therebetween, and means responsive to a read signal from said microprocessor-based control means for transmitting output of said clock to said microprocessor-based control means as said sensor signal.

18. The system set forth in claim 17 wherein said clock comprises clock oscillator and a second counter for providing said sensor signal as a digital signal to said microprocessor-based control means.

19. The system set forth in claim 18 wherein said microprocessor-based control means comprises a plurality of printed circuit board assemblies mounted in stacked orientation internally of said cover, and wherein said position-determining means is carried on one of said printed circuit board assemblies.

20. The system set forth in claim 19 further comprising first and second connectors on said cover, said microprocessor-based control means being coupled to said first connector for connection to an external source of said control signals, said position-determining means being coupled to said second connector for connection to said position sensor.

21. The system set forth in claim 18 wherein said servo valve is characterized by a predetermined gain increase over a specified temperature range, and
   wherein said armature comprises electronic coil means having at least one coil constructed of an electrical conductor having an increasing electrical resistance characteristic over said temperature range which substantially complements said predetermined gain increase, such that overall gain of said system remains substantially constant over said temperature range.

22. The system set forth in claim 21 wherein said valve driver means comprises a voltage-controlled amplifier, such that current to said armature coil means and force applied thereby to said armature and valve element vary with resistance of said coil means.

23. The system set forth in claim 22 wherein said conductor comprises a 60-alloy copper wire.

24. An electrohydraulic servo valve assembly comprising a servo valve including a manifold having openings for connection to a source of hydraulic fluid and to a load, a valve element variably positionable in said manifold for controlling flow of fluid among said openings, a stator mounted on said manifold for receiving valve control signals, an armature coupled to said valve element and responsive to said stator for variably positioning said valve element within said manifold, and a cover mounted on said manifold for enclosing said armature and stator,
   microprocessor-based control means mounted on said manifold within said cover, said control means including means for receiving and storing control signals from an external source, and means responsive to said control signals from said external source and coupled to said stator for generating said valve control signals, and
   valve drive means for generating said valve control signals as voltage-controlled pulse width modulated signals, said valve drive means comprising a differential amplifier having power inputs coupled to positive and negative supply voltages, a control input for receiving control signals, and a reference input coupled to ground, such that output of said amplifier is at ground in the absence of such control signals.

25. An electrohydraulic servo valve assembly comprising a servo valve including a manifold having openings for connection to a source of hydraulic fluid and to a load, a valve element variably positionable in said manifold for controlling flow of fluid among said openings, a stator mounted on said manifold for receiving valve control signals, an armature coupled to said valve element and responsive to said stator for variably positioning said valve element within said manifold, and a cover mounted on said manifold for enclosing said armature and stator, microprocessor-based control means mounted on said manifold within said cover, said control means including means for receiving and storing control signals from an external source, and means responsive to said control signals from said external source and coupled to said stator for generating said valve control signals, and valve drive means for generating said valve control signals as voltage-controlled pulse width modulated signals, said valve drive means comprising a pair of solid state switches having control electrodes for receiving valve control signals, and power electrodes for alternately connecting positive and negative voltage supplies to said armature as a function of said valve control signals.

26. The system set forth in claim 25 further comprising an inverter connected between said control electrodes, whereby said switches are both responsive to a single control signal to said inverter.

27. The system set forth in claim 26 wherein said switches comprise power MOSFETs.

28. An electrohydraulic servo system comprising a servo valve including a manifold having openings for connection to a source of hydraulic fluid and to a load, a valve element variably positionable in said manifold for controlling flow of fluid among said openings, a stator including electronic coil means mounted on said manifold for receiving valve control signals, an armature coupled to said valve element and responsive to said stator coil means for variably positioning said valve element within said manifold, said servo valve being characterized by a predetermined gain increase over a specified temperature range, and valve driver means for supplying said valve control signals to said stator, characterized in that said electronic coil means comprises at least one coil constructed of an electrical conductor having an increasing electrical resistance characteristic over said temperature range which substantially complements said predetermined gain increase, such that overall gain of said system remains substantially constant over said temperature range.

29. The system set forth in claim 28 wherein said valve driver means comprises a voltage-controlled amplifier, such that current to said armature coil means and force applied thereby to said armature and valve element vary with resistance of said coil means where the coil resistance sensitivity to temperature changes is controlled in a manner whereby the effect of temperature on coil current is compensated for.

30. The system set forth in claim 29 wherein said conductor comprises a low temperature coefficient of resistance wire.

31. The system set forth in claim 29 wherein said voltage-controlled amplifier comprises a differential amplifier having power inputs coupled to positive and negative supply voltages, a control input for receiving control signals, and a reference input coupled to ground, such that output of said amplifier is at ground in the absence of such control signals.

32. The system set forth in claim 29 wherein said voltage-controlled amplifier comprises a pair of solid state switches having control electrodes for receiving valve control signals and power electrodes for alternately connecting positive and negative voltage supplied to said armature as a function of said valve control signals.

33. The system set forth in claim 32 wherein said amplifiers further comprises an inverter connected between said control electrodes.

34. The system set forth in claim 33 wherein said switches comprises power MOSFETs.

* * * * *